(12) United States Patent
Greenfeld et al.

(10) Patent No.: US 7,876,067 B2
(45) Date of Patent: Jan. 25, 2011

(54) HIGH FREQUENCY CONNECTOR-LESS CHARGING SCHEME

(75) Inventors: Fred Greenfeld, Nederland, CO (US); Guruprakash Radhakrishnan, Melbourne, FL (US)

(73) Assignee: Intersil Americas Inc., Milpitas, CA (US)

( * ) Notice: Subject to any disclaimer, the term of this patent is extended or adjusted under 35 U.S.C. 154(b) by 162 days.

(21) Appl. No.: 11/736,897

(22) Filed: Apr. 18, 2007

(65) Prior Publication Data

US 2008/0116846 A1 May 22, 2008

Related U.S. Application Data

(60) Provisional application No. 60/821,505, filed on Aug. 4, 2006.

(51) Int. Cl.
*H02J 7/00* (2006.01)
(52) U.S. Cl. ................. 320/108; 363/21.1
(58) Field of Classification Search ............. 320/108, 320/137, 140, 141, 145; 363/21.1, 89, 20, 363/61, 84
See application file for complete search history.

(56) References Cited

U.S. PATENT DOCUMENTS

| | | | |
|---|---|---|---|
| 5,045,964 A | | 9/1991 | Bennett et al. |
| 6,118,249 A | | 9/2000 | Brockmann et al. |
| 6,144,564 A | * | 11/2000 | Fraidlin et al. ............. 363/16 |
| 6,160,374 A | | 12/2000 | Hayes et al. |
| 6,208,115 B1 | | 3/2001 | Binder |
| 6,548,985 B1 | | 4/2003 | Hayes et al. |
| 7,095,638 B2 | * | 8/2006 | Uusitalo .................. 363/97 |
| 7,139,179 B2 | * | 11/2006 | Hua ....................... 363/89 |
| 7,151,357 B2 | * | 12/2006 | Xian et al. ............... 320/108 |
| 7,274,575 B2 | * | 9/2007 | Ramabhadran et al. .... 363/21.1 |
| 2005/0046404 A1 | * | 3/2005 | Uusitalo .................. 323/285 |
| 2006/0018133 A1 | * | 1/2006 | Hua ..................... 363/21.01 |
| 2006/0209571 A1 | * | 9/2006 | Aso et al. .............. 363/21.01 |

OTHER PUBLICATIONS

Ray Radys, John Hall, John Hayes and Glenn Skutt; Optimizing AC and DC Winding Losses in Ultra-Compact, High-Frequency, High-Power Transformers; IEEE; 1999; pp. 1188-1195.

(Continued)

*Primary Examiner*—Edward Tso
*Assistant Examiner*—Ramy Ramadan
(74) *Attorney, Agent, or Firm*—Howison & Arnott, LLP

(57) ABSTRACT

A connector-less charging circuit includes a transformer having a primary side associated with a secondary side. A primary switch is responsive to a control signal for connecting the transformer to ground during a first portion of a duty cycle, and disconnecting the transformer from ground during the second portion of the duty cycle. An active clamp circuit connects to the primary side of the transformer for recycling leakage energy from the transformer back to the source responsive to the control signal during the second portion of the duty cycle. A PWM controller generates the control signal to both the active clamp circuit and the primary switch.

16 Claims, 5 Drawing Sheets

OTHER PUBLICATIONS

Hai-Jiang Jiang and Gaston Maggetto; Assessment of the Impact of Transformer Coupling Quality on Steady State Characteristics of Series Resonant Converters; IEEE; 1997; pp. 1186-1191.

R. Laouamer, J.-P. Ferrieux, H. Benqassmi, O. Normand and N. Buchheit; A Comparison o Resonant Converter Topologies with Three and Four Energy Storage Elements for Automatic Inductive Charging Application; Electric Machines and Power Systems; 1999; pp. 221-236; Taylor & Francis, Inc.

R. Watson and F.C. Lee; A Soft-Switched, Full-Bridge Boost Converter Employing an Active-Clamp Circuit; IEEE; 1996; pp. 1948-1954.

* cited by examiner

HIGH FREQUENCY CONNECTOR-LESS CHARGING SCHEME

CROSS-REFERENCE TO RELATED APPLICATIONS

This application is a non-provisional of U.S. application Ser. No. 60/821,505, entitled "HIGH FREQUENCY CONNECTOR-LESS CHARGING SCHEME", filed on Aug. 4, 2006.

TECHNICAL FIELD

This invention is related to the charging of portable electronic devices, and more particularly, to a system and method for connector-less charging of portable electronic devices.

BACKGROUND

The growing number of portable electronic devices that are used by individuals such as wireless headsets, PDA's, cell phones, Ipod's, MP3 players, etc., have increased the need for varying methods to recharge these devices. Existing technologies normally involve the use of a power cord that is plugged into the portable electronic device via some type of connector, and the power cord is plugged into a wall socket to charge the batteries of the device. This, of course, requires a certain amount of time to connect the portable electronic device to the power cord.

Devices such as an electric toothbrush have used connector-less charging methods by using a low frequency (line frequency) transformer to couple the primary and secondary sides of the transformer. Large spacings between the transformer, as dictated by the application, cause poor coupling between the primary and secondary sides, resulting in large leakage inductances. As a result, present day solutions use low frequency transformers to minimize the amount of leakage energy. The low frequency of operation generally makes the connector-less chargers fairly large for the amount of power they can transfer. These types of solutions are not effective with the higher frequencies involved in the charging of a portable electronic devices such as those mentioned above. Thus, some system and method for providing a connector-less charging connection for a portable electronic device is desired.

SUMMARY

The present invention, as disclosed and described herein, comprises, in one embodiment thereof, a connector-less charging circuit that includes a transformer having a primary side for coupling a charging voltage to a secondary side of the transformer. The primary side of the transformer is removably associated with the secondary side of the transformer. A primary switch is responsive to a control signal for connecting the transformer to ground during a first portion of a duty cycle and for disconnecting the transformer from ground during a second portion of the duty cycle. An active clamp circuit connected to the primary side of the transformer recycles leakage energy from the transformer back to the source responsive to the control signal during the second portion of the duty cycle. The control signal is generated by a PWM controller.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
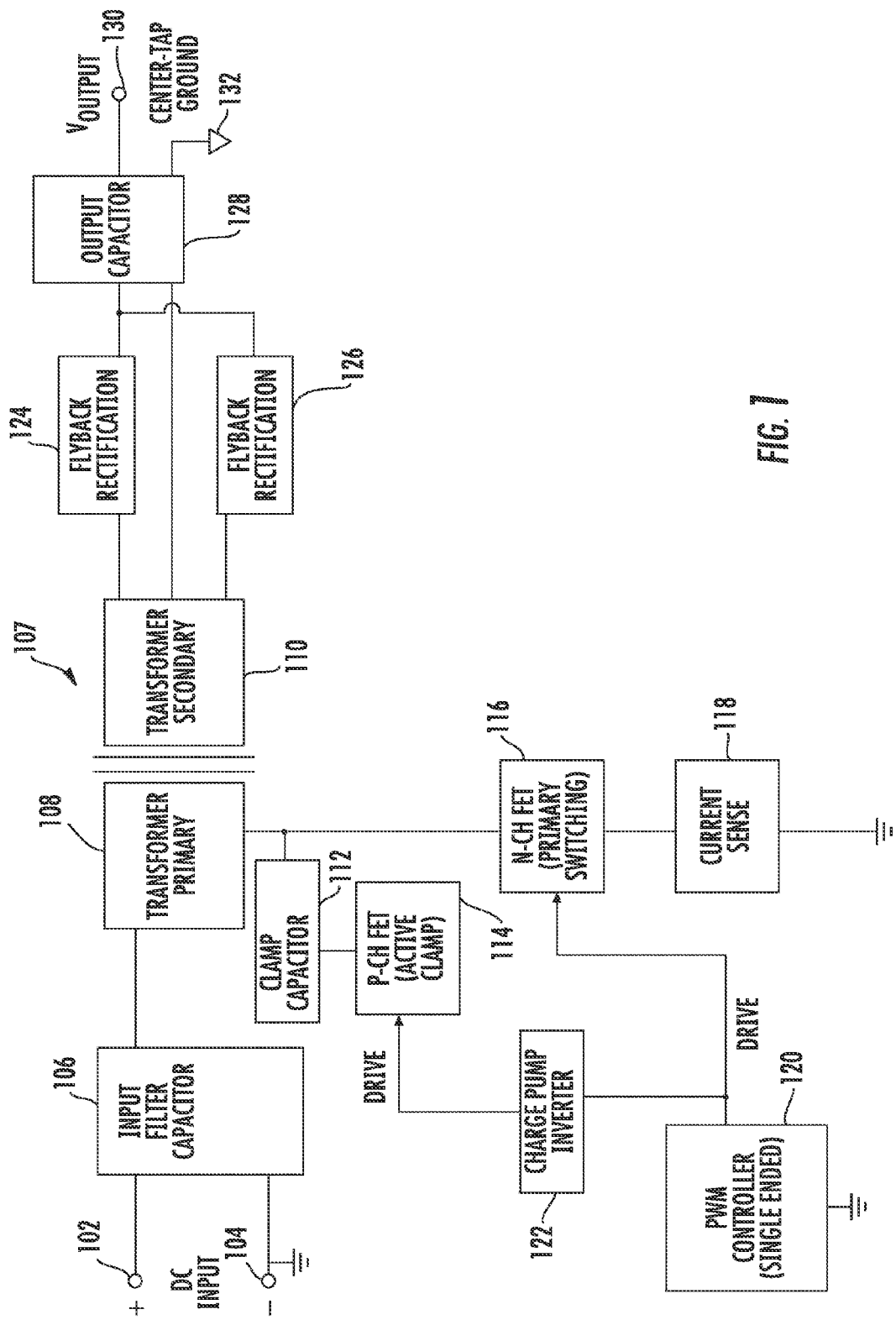
FIG. 1 is a block diagram of a connector-less charging circuit.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated a block diagram of a connector-less charging system according to the present disclosure. The configuration enables for the use of high-frequency charging in a connector-less charging technique using the modified DC to DC converter illustrated in FIG. 1. The higher frequency enables a smaller transformer 107 to be used. The proposed implementation operates at a switching frequency of at least 300 kHz enabling power components of a smaller size to be utilized. This provides for a manner of charging portable electric devices that operate within a provided DC input voltage range.

A first group of components associated with a transformer primary 108 are located in a charging base station that defines a charging bay for a portable electronic device. The DC input is placed across input terminals 102 and 104 to an input filter capacitor 106. The input filter capacitor 106 is connected to the transformer primary 108 of the transformer 107. The transformer primary 108 is separated from the transformer secondary 110 by an air gap, depending on a combination of the case thicknesses, and how tightly the portable electronic device is cradled in the charging bay. Connected to the transformer primary is a clamp capacitor 112 and an N-channel FET transistor 116, which comprises the primary switching transistor of the circuit. A P-channel FET transistor 114 actively resets the core of the transformer 107. The N-channel FET transistor 116 is connected to a current sense circuit 118, and the P-channel FET transistor 114 is connected to receive a drive signal from a PWM controller 120 through a charge pump inverter 122. The PWM controller 120 additionally provides control drive signals to the N-channel FET transistor 116. The PWM controller comprises a single-ended PWM controller. The combination of the P-channel FET transistor 114, N-channel FET transistor 116 and clamp capacitor 112 enables the circuit to utilize the benefit of an active clamp forward on the transformer primary 108 such that leakage and magnetizing energy are recycled back to the source. The active clamp forward on the transformer primary 108 recycles most of the leakage energy back to the source and provides an ideal reset mechanism for efficiency of operation.

The other portion of the transformer 107 consists of the transformer secondary 110. The transformer secondary 110 and all associated components are located within the portable electronic device while the components described previously associated with the transformer primary are associated with some type of base station unit having a charging bay for the electronic device. Connected to the transformer secondary 110 are two rectifiers 124 and 126 to rectify the signals from the transformer secondary 110. The rectifiers 124 and 126 are each connected to an output capacitor 128. The output capacitor 128 is connected across the output node 130 and a center-tap ground 132 and is peaked charged by the transformer secondary 110.

The use of peak charging of the output capacitor enables the design to eliminate the output inductor. Elimination of the output inductor improves load regulation particularly at light loads. Given the requirements of the application, the primary and secondary circuits are separable sections. The converter produces an unregulated output and does not require monitoring of the output voltage for regulation. There will be no feedback, thereby allowing open-loop operation. The transformer secondary 110 comprises an asymmetrically configured center-tapped transformer. The open loop operation of the circuit means that the converter operates at its maximum duty cycle which is limited only by the voltage stress on the N-channel FET transistor 116. The embodiment presented here limits the duty cycle to a maximum of 50%, but is practically limited to approximately 47%. The turns ratio of the asymmetrical secondary windings need to be selected to account for the duty cycle of N-channel FET transistor 116. The voltages developed across each secondary winding must be equal to the desired output voltage (plus losses) when they are conducting since the output capacitor 128 is peak charged. By asymmetrically winding the center-tapped transformer secondary 110, the voltage applied to the output capacitor 128 during the on time and during off time can be made equal. By having the center-tapped transformer asymmetrically wound in an appropriate manner, the peak charging of the capacitor 128 will be roughly equal during each portion of the switching cycle. No inductor is used in the transformer secondary to allow open loop regulation under light and no load conditions.

Figure 2:
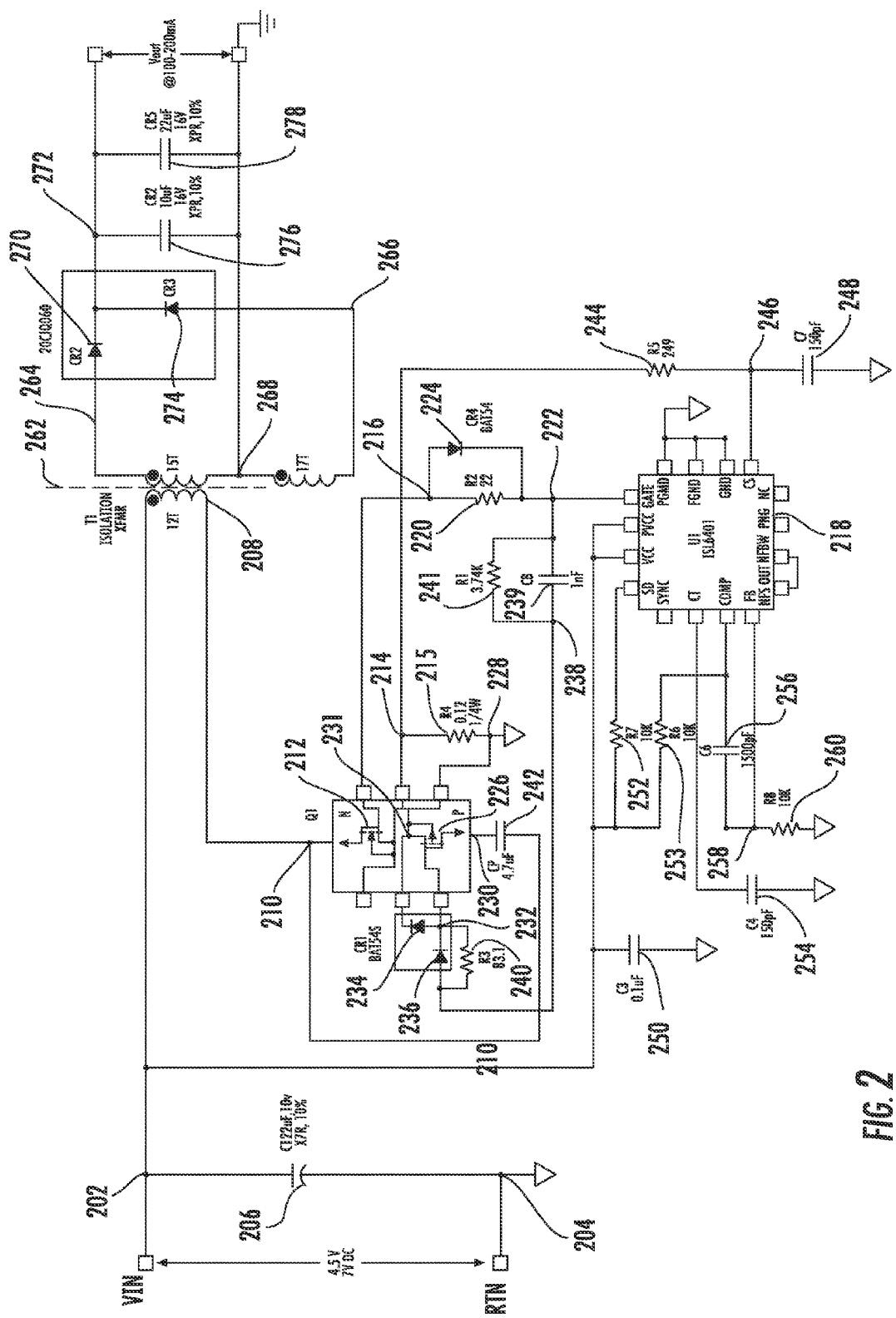
FIG. 2 is a schematic diagram of one embodiment of the connector-less charging circuit of FIG. 1.

Referring now to FIG. 2, there is illustrated a schematic diagram of one embodiment of the circuit of FIG. 1. The input voltage is applied across nodes 202 and 204 across a capacitor 206. The capacitor 206 comprises the input filter capacitor 106 described previously with respect FIG. 1. A first side of the transformer primary of transformer 208 is connected to node 202. The second side of the transformer primary of transformer 208 is connected to node 210. As described previously with respect to FIG. 1, the node 210 is connected to a clamp capacitor 242 and to an N-channel FET transistor 212, which comprises the primary switching transistor. The P-channel FET transistor 226 is connected to the primary circuit between nodes 230 and node 231. The charge pump inverter consists of diodes 234 and 236, resistors 240 and 241, and capacitor 239. Diode 234 has its anode connected to node 232 and its cathode connected to node 231. Diode 236 has its anode connected to node 238 and its cathode connected to node 232. A resistor 240 is in parallel with the diode 236 between nodes 232 and 238. The gates of N-channel transistor 212 and P-channel transistor 226 each receive control signals form a PWM controller 218. The PWM controller 218, in one implementation, may comprise the ISL 6401 controller manufactured by Intersil, Inc., which is a single-ended controller. However, it would be realized by one skilled in the art, that other types of PWM controllers may be utilized to produce a control signal to the transistors 212 and 226 in a desired manner.

The connection between the gate of transistor 212 and the PWM controller 218 includes a resistor 220 connected between the gate node 216 of the transistor 212 and the output node 222 of the PWM controller 218. A diode 224 is connected in parallel with the resistor 220, having its anode connected to node 216 and its cathode connected to node 222. The control path between the gate of transistor 226 and the control output node 222 of the PWM controller 218 includes the charge pump as described previously consisting of diodes 234 and 236, resistors 240 and 241, and capacitor 239. A resistor 244 is connected between node 214 and node 246. Node 246 is also connected to the PWM controller 218. A capacitor 248 is connected between node 246 and ground. A capacitor 250 is connected between node 202 and ground. A resistor 252 is connected between node 202 and the SD input of the PWM controller 218. Node 246 is connected to the CS input of the PWM controller 218. A capacitor 254 is connected between the CT input of the PWM controller 218 and ground. A capacitor 256 is connected between the COMP input and node 258. The FB input of the PWM controller 218 is also connected to node 258. A resistor 260 is connected between node 258 and ground.

The transformer 208 is split along line 262 such that the remaining components described herein would be located in the portable electronic device that is being charged by the connector-less charging system. The portions of the circuit previously described would be associated with the base-station charging unit. The secondary of the transformer 208 consists of an asymmetrically wrapped center-tapped transformer. A first end of the transformer secondary is connected to node 264. The second end of the secondary of transformer 208 is connected to node 266. The center-tapped node of the secondary of the transformer is at node 268. The rectification described previously with respect to FIG. 1 is performed by diodes 270 and 274. Diode 270 has its anode connected to node 264 and its cathode connected to node 272. Diode 274 has its cathode connected to node 272 and its anode connected to node 266 on the second side of the secondary of the transformer 208. A parallel combination of capacitors 276 and 278 connected between node 272 and the center-tap node 268 of the secondary of transformer 208 comprise the output capacitance of the circuit. Node 272 provides the output voltage across the capacitors 276 and 278, and node 268 provides the center-tap ground of the circuit.

The implementation illustrated in FIGS. 1 and 2 enables the use of a DC to DC converter at high frequencies of approximately 300 kH in a connector-less charger. The specific topology utilizes the key benefits of an active clamp forward on the transformer primary by recycling most of the leakage and magnetizing energy back to the source using the combination of the capacitor 242 and P-channel transistor 226 under the control of the PWM controller 218. Additional benefits are achieved on the secondary of the transformer utilizing an asymmetrically configured center-tapped transformer, rectification using diodes 270 and 274, and peak charging an output capacitor consisting of capacitors 276 and 278. No secondary inductor is used. The output is achieved by peak charging the output capacitors on the secondary side, and omitting the inductor to allow for open loop operation. These benefits are more fully illustrated in FIGS. 3-5.

Figure 3:
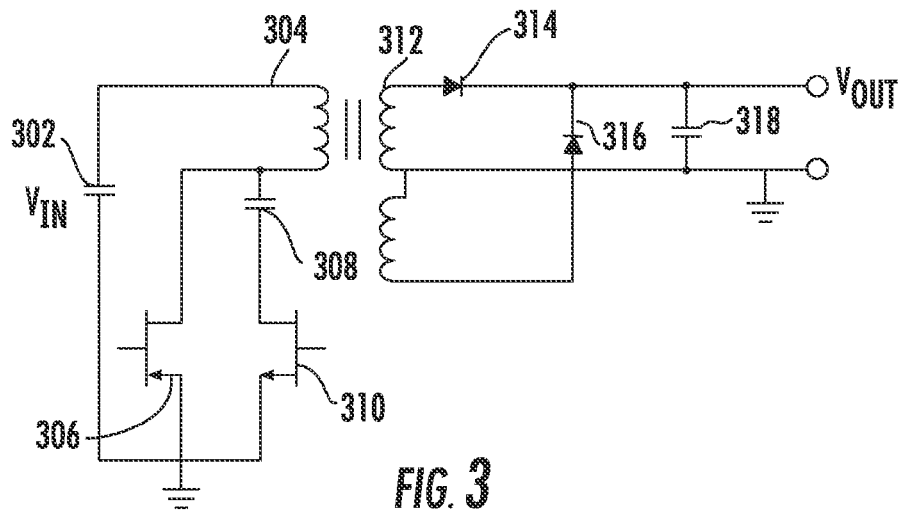
FIG. 3 is a schematic diagram of the embodiment of FIG. 2 illustrating the active clamp and asymmetrically wound center-tapped secondary.

Referring now to FIG. 3, there is illustrated a basic schematic diagram of the connector-less charging circuit of the present invention. The input voltage 302 is applied to the transformer primary side 304. The other end of the transformer primary is connected to the primary switching N-channel transistor 306 and the through the active clamp portion of the circuit consisting of capacitor 308 and transistor 310 depending on the state of the transistors. The center-tapped secondary transformer 312 is inductively coupled to the transformer primary and provides an output through the rectification circuit consisting of diodes 314 and 316 across output capacitor 318. The duty cycle of the control signals applied to transistors 306 and 310 cause transistor 310 to be off when transistor 306 is turned on, and for transistor 310 to be turned on when transistor 306 is turned off.

Figure 4:
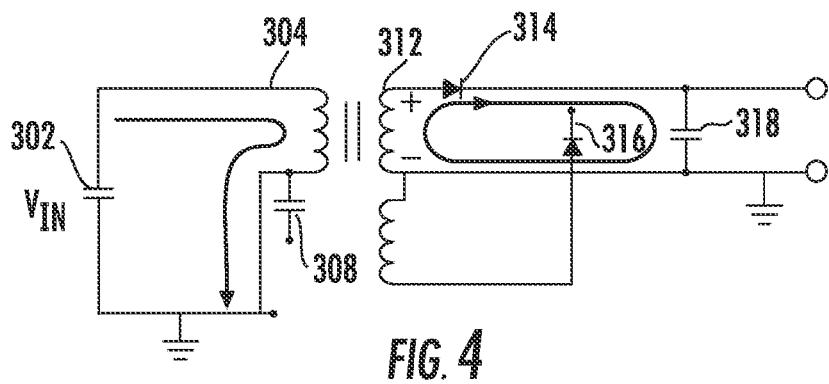
FIG. 4 illustrates the circuit of FIG. 3 in a first state of operation.

Referring now to FIG. 4, there is illustrated the operation of the circuit when the transistor 306 is turned on and transistor 310 is turned off. This state of operation causes the input voltage to be coupled across the transformer from the primary side 304 to the secondary side 312. In this state of operation, the diode 316 is reverse-bias and the upper portion of the secondary transformer peak charges the capacitor 318 as illustrated. In this situation, the first portion of the asymmetrically wrapped center-tapped transformer 312 peak charges the capacitor 318.

Figure 5:
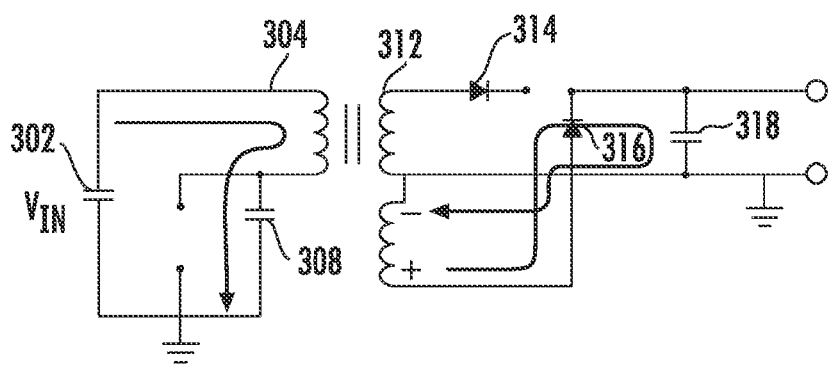
FIG. 5 illustrates the circuit of FIG. 3 in second state of operation.

Referring now to FIG. 5, there is illustrated the second state of operation of the circuit wherein the transistor 306 is turned off and transistor 310 is turned on. In this case, when the primary side is turned off, the primary side 304 charges the clamp capacitor 308, enabling the leakage energies to be funneled back to the source as it discharges. On the secondary side, the diode 314 is reverse-bias such that the capacitor 318 is peak charge by the second portion of the center-tapped secondary transformer 312 as illustrated.

Figure 6:
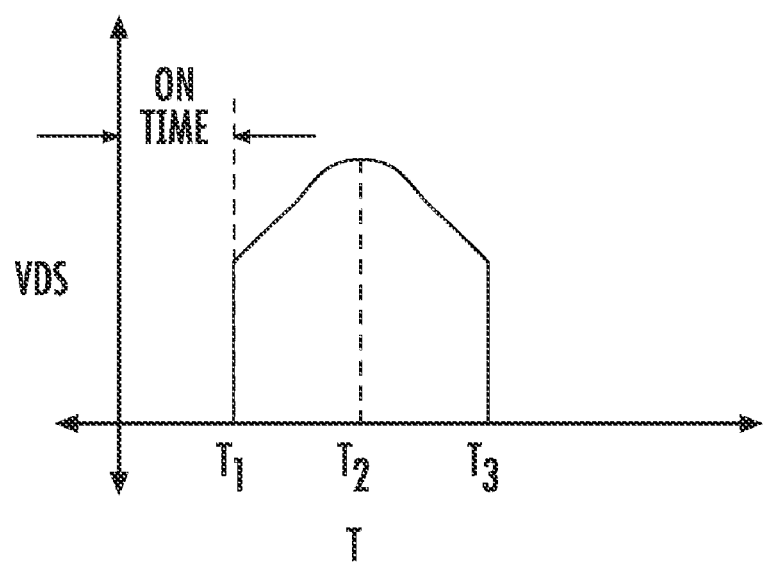
FIG. 6 is a typical illustration of the drain-to-source voltage of the primary switching transistor versus time.

Referring now to FIG. 6, there is illustrated the drain-to-source voltage of the P-channel transistor 310 at various points of operation of the circuitry. Once the magnetizing energy with the transformer has fully been used to charge up the capacitor 308, the capacitor starts recycling this stored energy back to the source 302. The p-channel transistor 310 provides a return path for the flow of this energy. From time $0$ to time $T_1$ comprises the "on" time of the transistor 306 when the drain-to-source voltage on the P-channel transistor 310 is 0. When P-channel transistor 310 is turned on and N-channel transistor 306 is turned off at time $T_1$, the drain-to-source voltage increases from $T_1$ to $T_2$ as the inductor within transformer 304 charges the capacitor 308. Once the capacitor 308 is completely charged at time $T_2$, P-channel transistor 310 enables the discharge of the capacitor to ground from $T_2$ to $T_3$.

Figure 7:
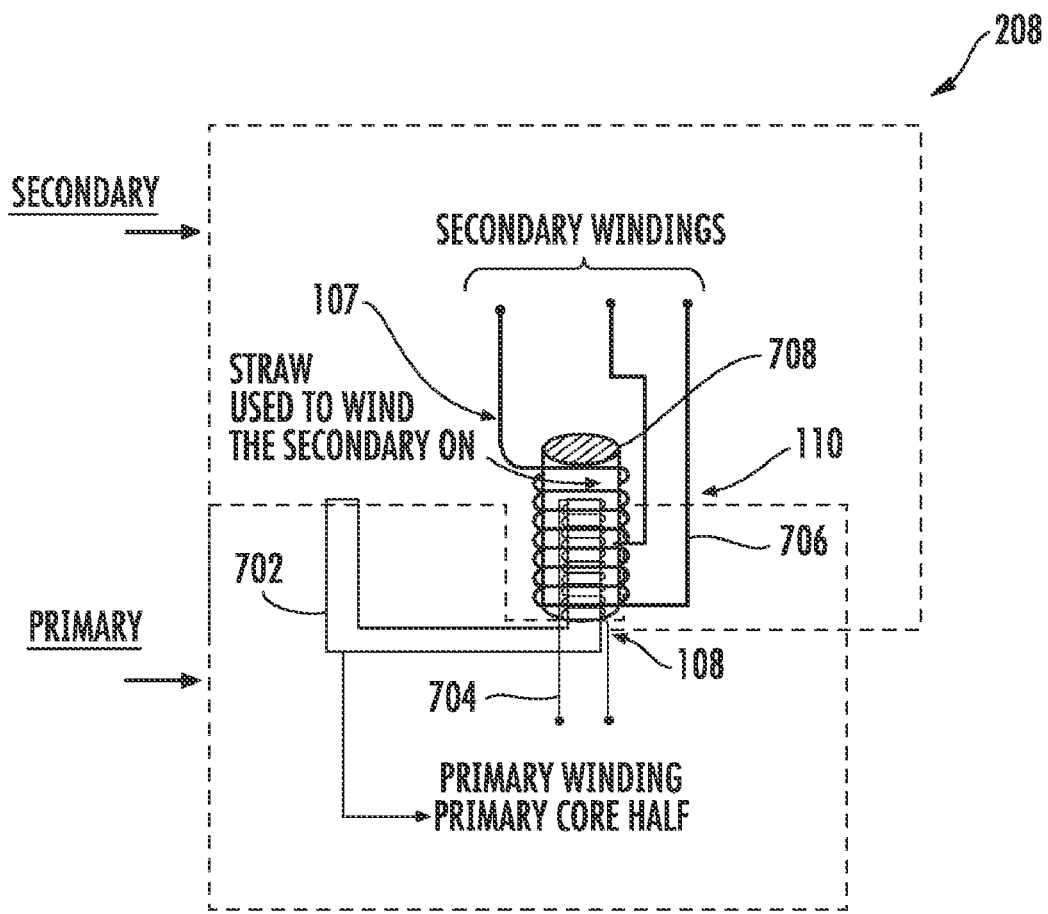
FIG. 7 illustrates the physical implementation of the transformer of the circuit of FIG. 2.

Referring now to FIG. 7, there are illustrated additional improvements to the connector-less charging system that may be achieved by the construction of the transformer 107. The transformer 107 consists of a separable transformer primary portion 108 and transformer secondary portion 107. The transformer primary 108 includes a core 702 and winding 704 wound around it. The leg of the core 702 around which the winding 704 is wrapped is inserted within the concentrically wound secondary winding of the transformer 110. The implementation of this scheme is represented, but not limited to, the configuration discussed above.

This configuration maximizes the electromagnetic coupling between the transformer primary 108 and transformer secondary 110. This maximized coupling is key to achieving a reasonably good line and load regulation despite a large air gap between the primary and secondary. This air gap is dictated primarily by the wall thickness of the portable electronic device charger and the portable electronic device in order to properly insulate the transformers. This thickness is assumed to be between 0.8 mm to 1 mm. While the configuration of FIG. 7 illustrates that the core of the secondary winding 110 is configured such that the primary winding 108 may be inserted concentrically on the inside of the secondary winding 110, in an alternative embodiment, the configuration could be altered such that the secondary winding could be inserted within the primary winding. This configuration maximizes the coupling between the two halves of the transformer 208 to achieve good line and load configuration despite the large air gap.

It will be appreciated by those skilled in the art having the benefit of this disclosure that this invention provides an improved connector-less charging scheme for charging portable electronic devices, with the supply switching at frequencies of 300 kHz and above. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A connector-less charging circuit, comprising:
   a transformer having a primary side for coupling a charging voltage to a secondary side of the transformer, the primary side removably associated with the secondary side, wherein the secondary side of the transformer comprises an asymmetrically wrapped center tapped transformer;
   an output capacitor, wherein the output capacitor is peaked charged only by a first portion of the asymmetrically wrapped center tapped transformer during the first portion of the duty cycle and only by a second portion of the asymmetrically wrapped center tapped transformer during the second portion of the duty cycle;
   a primary switch responsive to a control signal for connecting the transformer to ground during a first portion of a duty cycle and disconnecting the transformer from ground during a second portion of the duty cycle;
   an active clamp circuit connected to the primary side of the transformer for recycling leakage energy from the transformer back to a source voltage responsive to the control signal during the second portion of the duty cycle; and
   a PWM controller for generating the control signal.

2. The connector-less charging circuit of claim 1, wherein the active clamp circuit further includes:
   a clamp capacitor; and
   a p-channel transistor switch for connecting the clamp capacitor to ground during the second portion of the duty cycle.

3. The connector-less charging circuit of claim 1, wherein the PWM controller comprises a single-ended controller.

4. The connector-less charging circuit of claim 1, wherein circuit operates at a frequency of at least 300 kilohertz.

5. The connector-less charging circuit of claim 1, wherein the primary side of the transformer further comprises a core half with a winding wrapped around one leg of the core half.

6. The connector-less charging circuit of claim 5, wherein the secondary side of the transformer further comprises:
two sets of windings configured to slide over the primary side of the transformer; and
wherein the core-winding combination of the primary side of the transformer is inserted concentrically within the secondary windings to enable electrical coupling between the primary side and the secondary side.

7. The connector-less charging circuit of claim 6, wherein an amount of coupling is responsive to an airgap between the primary core and secondary core halves.

8. A connector-less charging circuit, comprising:
a transformer having a primary side for coupling a charging voltage to a secondary side of the transformer, the primary side removably associated with the secondary side, wherein the secondary side of the transformer comprises an asymmetrically wrapped center tapped transformer;
an output capacitor, wherein the output capacitor is peak charged only by a first portion of the asymmetrically wrapped center tapped transformer during a first portion of the duty cycle and only by a second portion of the asymmetrically wrapped center tapped transformer during a second portion of the duty cycle;
a primary switch responsive to a control signal for connecting the transformer to ground during the first portion of a duty cycle and disconnecting the transformer from ground during the second portion of the duty cycle;
an active clamp circuit connected to the primary side of the transformer for recycling leakage energy from the transformer back to a source voltage responsive to the control signal during the second portion of the duty cycle, wherein the active clamp circuit further includes:
a clamp capacitor; and
a p-channel transistor switch for connecting the clamp capacitor to ground during the second portion of the duty cycle to recycle the leakage energy back to ground and for disconnecting the clamp capacitor from ground during the first portion of the duty cycle; and
a PWM controller for generating the control signal.

9. The connector-less charging circuit of claim 8, wherein the PWM controller comprises a single-ended controller.

10. The connector-less charging circuit of claim 8, wherein circuit operates at a frequency of at least 300 kilohertz.

11. The connector-less charging circuit of claim 8, wherein the primary side of the transformer further comprises:
a core having at least one leg; and
a winding wrapped around the at least one leg.

12. The connector-less charging circuit of claim 11, wherein the secondary side of the transformer further comprises:
two sets of windings configured to slide over the primary side of the transformer; and
wherein the core-winding combination of the primary side of the transformer is inserted concentrically within the secondary windings to enable electrical coupling between the primary side and the secondary side.

13. A system, comprising:
a charging base station defining a charging bay therein;
a portable electronic device configured to fit within the charging bay of the charging base station;
charging circuitry for providing a charging voltage to the portable electronic device in the charging bay, the charging circuitry comprising:
a transformer having a primary side within the charging base station for coupling the charging voltage to a secondary side of the transformer within the portable electronic device, the primary side removably associated with the secondary side, wherein the secondary side of the transformer within the portable electronic device comprises an asymmetrically wrapped center tapped transformer;
an output capacitor within the portable electronic device, wherein the output capacitor is peak charged only by a first portion of the asymmetrically wrapped center tapped transformer during a first portion of the duty cycle and only by a second portion of the asymmetrically wrapped center tapped transformer during a second portion of the duty cycle;
a primary switch within the charging base station responsive to a control signal for connecting the transformer to ground during the first portion of a duty cycle and disconnecting the transformer from ground during the second portion of the duty cycle;
an active clamp circuit connected to the primary side of the transformer within the charging base station for recycling leakage energy from the transformer back to a source voltage responsive to the control signal during the second portion of the duty cycle; and
a PWM within the charging base station controller for generating the control signal.

14. The system of claim 13, wherein the active clamp circuit further includes:
a clamp capacitor; and
a p-channel transistor switch for connecting the clamp capacitor to ground during the first portion of the duty cycle.

15. The system of claim 13, wherein the PWM controller comprises a single-ended controller.

16. The system of claim 13, wherein system operates at a frequency of at least 300 kilohertz.

* * * * *